United States Patent [19]
Langberg et al.

[11] Patent Number: 6,167,034
[45] Date of Patent: Dec. 26, 2000

[54] RATE ADAPTIVE DIGITAL SUBSCRIBER LINE (RADSL) MODEM

[75] Inventors: Ehud Langberg, Ocean Township; William Henry Scholtz, Middletown, both of N.J.

[73] Assignee: Globespan Technologies, Inc., Red Bank, N.J.

[21] Appl. No.: 09/016,994

[22] Filed: Feb. 2, 1998

Related U.S. Application Data

[63] Continuation of application No. 08/690,243, Jul. 19, 1996, Pat. No. 5,751,701.

[51] Int. Cl.[7] .................................. H04J 1/00; H04B 3/10
[52] U.S. Cl. ............................................. 370/281; 370/540
[58] Field of Search .................................... 370/222, 281, 370/535, 536, 540, 541, 542, 543, 544; 709/202, 228

[56] References Cited

U.S. PATENT DOCUMENTS

| | | | |
|---|---|---|---|
| 4,756,007 | 7/1988 | Qureshi et al. | 375/37 |
| 4,802,189 | 1/1989 | Wedler | 375/37 |
| 5,023,869 | 6/1991 | Grover et al. | 370/84 |
| 5,394,392 | 2/1995 | Scott | 370/24 |
| 5,450,438 | 9/1995 | Landry et al. | 375/222 |
| 5,541,955 | 7/1996 | Jacobsmeyer | 375/222 |
| 5,751,701 | 5/1998 | Langberg et al. | 370/281 |
| 6,031,848 | 2/2000 | Brennan | 370/522 |

FOREIGN PATENT DOCUMENTS

0 112 953  12/1982  European Pat. Off. ........... H04J 3/16

*Primary Examiner*—Chi H. Pham
*Assistant Examiner*—Brenda H. Pham
*Attorney, Agent, or Firm*—Thomas, Kayden, Horstemeyer & Risley

[57] ABSTRACT

The invention provides a transceiver which is preferably used for high speed communications between a customer location and a central office over a subscriber line. The transceiver uses a pseudorandom noise generator both to provide a correlation for a complementary transceiver to use in achieving synchronization and as a way to transmit data in an extremely robust fashion. In addition, the transceiver uses frequency domain multiplexing so that downstream data and upstream data are transmitted by their respective transceivers in completely separate and distinct frequency bands. In order to achieve high data transfer rates, the transceivers can operate in an asymmetrical manner, whereby either (but, typically, the central office) transceiver can transmit data at a higher rate than the other transceiver.

8 Claims, 8 Drawing Sheets

HIGH LEVEL RADSL STARTUP SEQUENCE

RATE ADAPTIVE DIGITAL SUBSCRIBER LINE (RADSL) MODEM

CROSS REFERENCE TO RELATED APPLICATION

The present application is a continuation of U.S. patent application Ser. No. 08/690,243, now U.S. Pat. No. 5,751,701, filed Jul. 19, 1996.

BACKGROUND OF THE INVENTION

The present invention relates to a high speed modem. In particular, the present invention relates to a modem which is intended for use between a subscriber's location and a telephone company central office.

Modems have been used for many years to modulate and demodulate digital signals for transmission over telephone lines. As the demand for higher and higher transmission speeds have increased, newer technologies have been used to provide modems which are able to more effectively meet such demands.

With data transfer speeds ever on the increase, problems have developed in achieving the highest possible data transmission speeds in specific situations.

SUMMARY OF THE INVENTION

In accordance with the preferred embodiment of the invention, a modem has been developed which is able to use Plain Old Telephone Service ("POTS") to provide bit rates ranging from approximately 600 kilobits/second ("kb/s") to speeds greater than 7 Megabits/second ("MB/s") from the network (central office) to the customer premises, and from approximately 136 kb/s to at least 1 Mb/s from the customer premises to the network.

The present invention is designed to operate on single twisted metallic cable pairs which extend between the customers premises and the network.

DETAILED DESCRIPTION OF THE PREFERRED EMBODIMENT OF THE INVENTION

Figure 1:
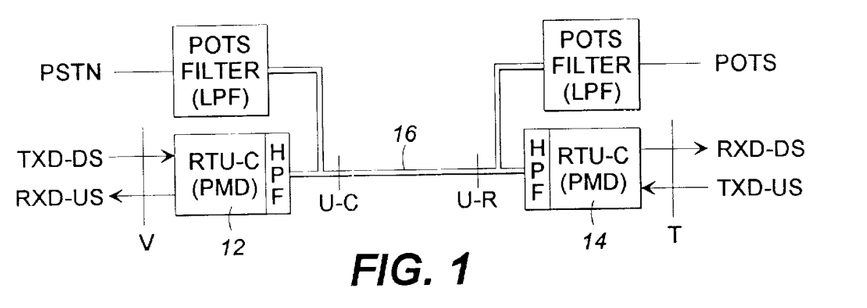
FIG. 1 illustrates a schematic diagram of a typical system of the type used in the present invention.

In accordance with the present invention, a system 10 employing Rate Adaptive Digital Subscriber Line ("RADSL") transceivers 12, 14 based upon the Carrierless AM/PM ("CAP") modulation scheme is illustrated in FIG. 1. As shown, there is a RADSL modem, or transceiver 12, located at a customer's location, and a complementary RADSL transceiver 14 located at the central office of the local telephone company. The transceivers 12, 14 are connected together over a communications channel 16 which generally comprises a standard twisted pair of metal wires, of the type long used in Plain Old Telephone Systems ("POTS").

In accordance with the invention, the transceivers 12, 14 are able to communicate digital data between their respective locations at extremely high data rates. In particular, bit rates ranging from approximately 600 kb/s to approximately 7 MB/s can be achieved for data transferred from the network (central office) to the customer premises, and bit rates of approximately 200 kb/s to 1 Mb/s can be achieved for data transferred from the customer premises to the network. The foregoing is accomplished by use of a number of techniques, described herein, which enable the data to be modulated and transmitted over the POTS system.

Figure 2:
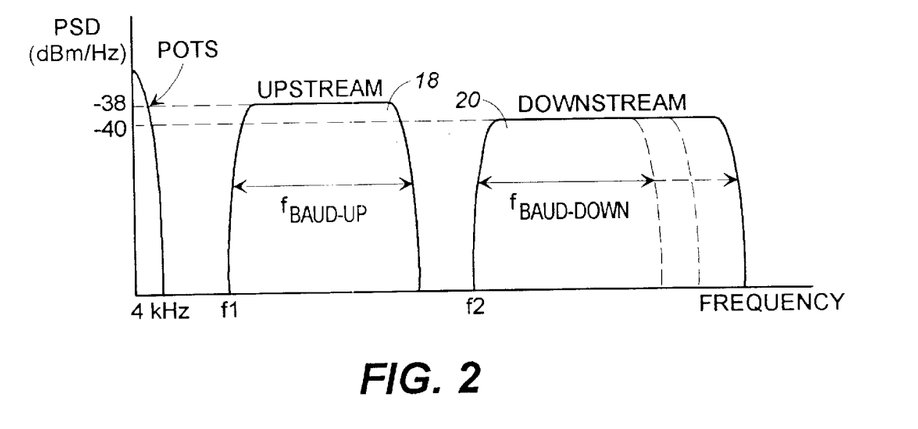
FIG. 2 illustrates the frequency domain multiplexing which is used by the system in accordance with the present invention.

Referring to FIG. 2, one technique used by the present invention is to separate the bandwidth of the line whereby the actual data being transmitted "upstream", i.e., from the customer's location to the network, is transmitted in a first band 18, having a frequency which runs upward from $f_1$, while the data which is transmitted "downstream", i.e., from the network to the customer's location, is transmitted in a second, higher frequency band 20, which has a frequency which runs upward from $f_2$. As illustrated in FIG. 2, the highest frequency in the upstream band 18 is separated (i.e., lower than) from the lowest frequency, $f_2$, in the downstream band 20. As further illustrated in FIG. 2, the lowest frequency, $f_1$, in the upstream band 18 is separated from, and higher than, the typical POTS frequency of 4 kHz.

In view of the above, it can be seen that in accordance with the invention, the transceivers 12, 14 of FIG. 1 are each transmitting over the communications channel 16 in different frequency ranges 18, 20, as illustrated in FIG. 2. Further, in accordance with the present invention, as the ability to achieve the highest possible data transfer rates is a particular objective of the invention, it is not necessary to have both of the transceivers 12, 14 transmitting at the same rate. Accordingly, it is within the scope of the invention to have either the customer's transceiver 12, or (more typically) the network transceiver 14 transmitting at a higher data rate. Thus, it is within the scope of the invention to have the transceivers 12, 14 provide for asymmetrical data transmission rates.

An objective, therefore, of the present invention is to provide a means by which the transceivers 12, 14 can establish a reliable connection with one another while maximizing their ability to reliably transmit data at the highest possible rates. With the foregoing objective in mind, the present invention provides a means by which the transceivers 12, 14 can initialize communications and establish the highest possible data transmission rates over the communications channel 16, which is comprised of a metal twisted pair which extends between the customer's location and the network.

To accomplish this goal, the present invention requires a robust scheme for providing the initial start-up of communication between the transceivers 12, 14. The intent of this start-up procedure is to allow the transceivers 12, 14 to establish their initial handshake, perform rate negotiation, provide a symbol/baud rate, and transfer such other information as fast, reliable communications require.

As is understood by those skilled in the art, the term "constellation" refers to a mechanism by which a data bit stream can be converted into symbols for transmission over the communications channel 16. The "size" of the constellation is determined by the number of bits which can be encoded into each symbol, while the largest size constellation which can be transferred over the communications channel 16 is determined by the quality of the communications channel 16.

From the perspective of bit stream transfer, the higher the symbol rate which can be transferred over the communications channel, for a given number of bits/symbol, the higher the data transfer rate over the channel. Alternatively, the larger the constellation (meaning the greater the number of data bits which are encoded, on a per symbol basis), the higher the data transfer rate over the channel. Thus, if a particular channel 16 is able to support both a high symbol rate and a large constellation, a high data transfer rate will be supported on the channel 16. Accordingly, it is an objective of the present invention to determine both the highest symbol rate and the largest constellation which can be reliably supported on the channel 16.

Figure 4:
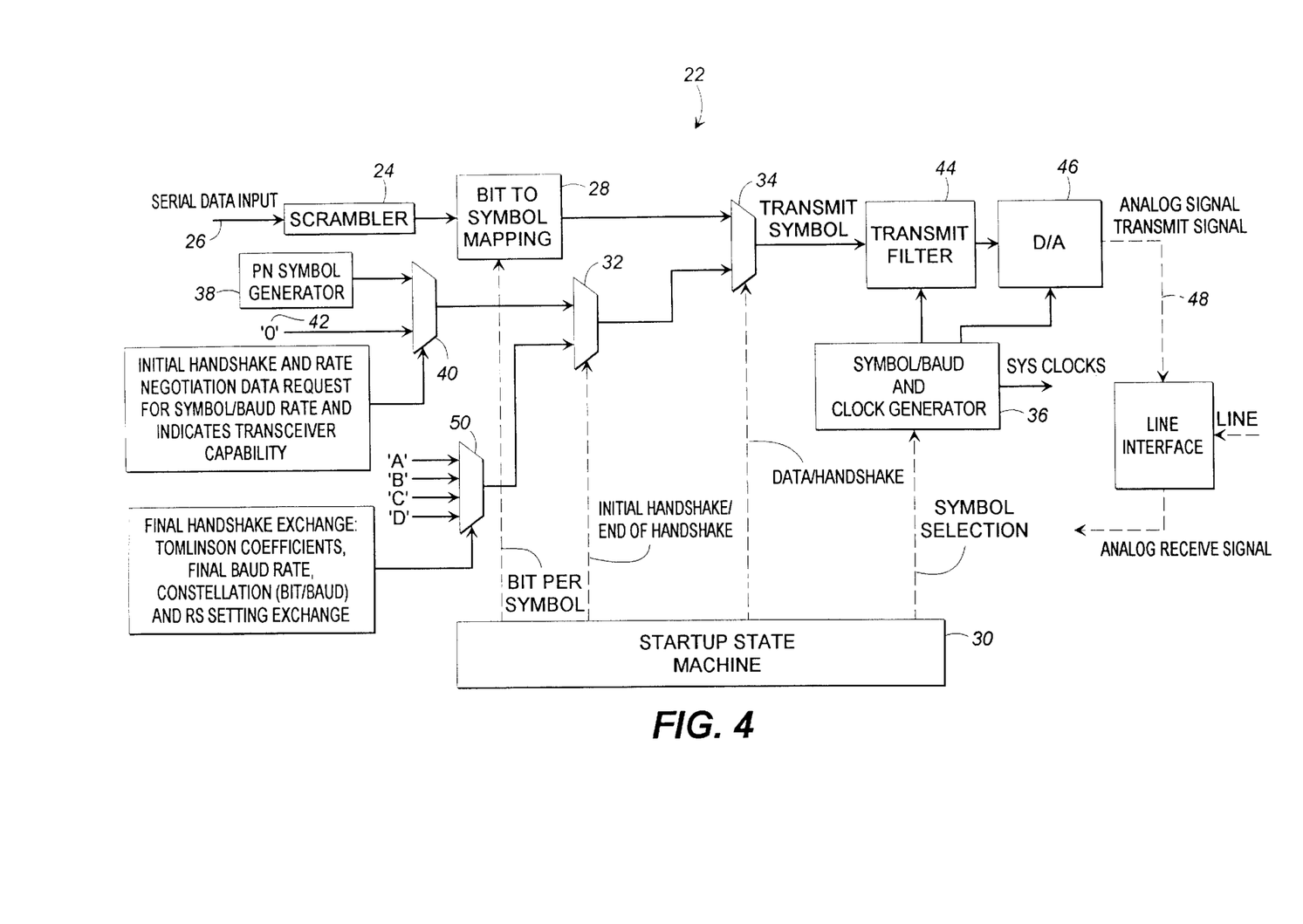
FIG. 4 is a block diagram of the startup handshake/data signal generator of the present invention.

In order to accomplish these goals, a handshake/data signal generator 22, illustrated in FIG. 4 is used to perform the rate negotiation of the RADSL transceivers 12, 14 of the present invention. In particular, the invention employs a RADSL transceiver which is able to support a predetermined, finite set of constellations and baud rates, one of which will be selected for each startup. In performing the startup sequence, there is an initial training sequence which uses an extremely robust scheme to assure detection. This is needed, because at startup the receiver and the timing recovery function are not yet operational. The scheme selected for use in the preferred embodiment of the invention uses a binary pseudorandom number ("PN") sequence which is spread over a large number of symbols. In the preferred embodiment of the invention, the PN is 63 symbols long, although other values (preferably of the form, $2^n-1$, may be used). Since the information in the PN is spread over many symbols, detection is very reliable and robust, so can be made without the need for adaptive filters or timing recovery. The benefit of using the PN is that a synchronization detection device, in the receiver, can use a correlator, which matches the synchronization signal, and yields distinctive signal characteristics which can be used to differentiate the synchronization signal from the data signal in noisy environments. In the present invention, this feature is used to provide a particular training signal to the receiver.

The handshake of the present invention is highly robust in that it is preferably based upon a PN having a length of 63 symbols. Thus, while it is relatively time consuming to send 63 symbols to represent a single "1" bit, the long PN sequence allows the receiving transceiver 14 to use a correlator to uniquely identify that the transmitting transceiver 12 has, in fact, sent a "1". Similarly, in accordance with the preferred embodiment of the invention, in order for the sending transceiver 12 to send a "0" bit, it will send 63 zero symbols. By using this method, and by performing it at a low baud rate, there is a very low error rate, irrespective of the quality of the communications channel 16.

This ability of the synchronization detection device in the receiving transceiver 14 to differentiate the synchronization signal from the data signal in a noisy environment is based upon the use of the PN sequence in the header of the transmitted signal. When such a PN sequence is repeated at the transmitter and correlated at the receiver with a copy of the non-repeated pattern, the correlator produces a high value (peak) when there is a match and low values (quiet zone) otherwise. Since the sequence is repeated, information known, a priori, about the periodicity and the width of the peaks and quiet zones can be used to enhance detection reliability. Accordingly, the particular synchronization pattern used, has distinctive properties in its autocorrelation function, so its use preferably improves the synchronization reliability of the system. This feature of the invention is the reason for using the PN in the header.

When such a sequence of length, N, with symbols assuming the values, "1" and "–1" (which substitutes for "0"), is repeated at the transmitter and correlated at the receiver, which uses a stored copy of the sequence with values, "1" and "0", the correlator output yields a high peak when the sequence is matched and a low value otherwise. It is also possible to use the sequences of "1" and "0" values at the transmitter and correlate with a stored copy of a sequence of "1" and "–1" (which substitutes for "0") values at the receiver.

Figure 3:
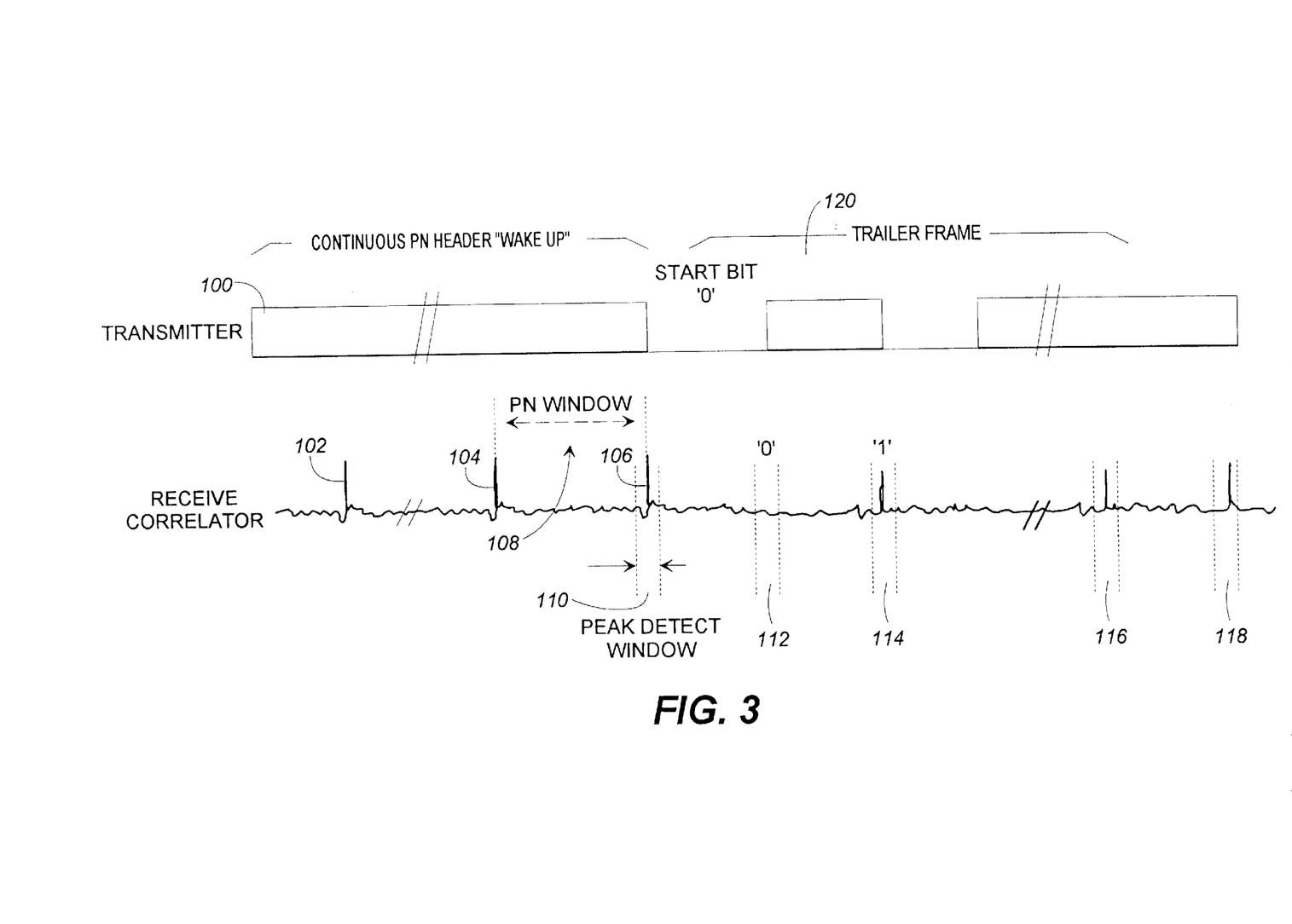
FIG. 3 is a diagram illustrating the synchronization signals received by the receiver in response to the receiver's receipt of the PN signal transmitted by the transmitting transceiver when communications are established.

With reference to FIG. 3, the "wake up" sequence used by the transmitter is illustrated to be a continuous PN header. The correlator in the receiver continuously looks for a "1", which corresponds to the recognition of the arrival of the PN. Upon receipt of a valid PN signal, as illustrated at 102, 104, 106, the receiver continues to look for either a "1", corresponding to the receipt of another PN signal following a time period indicated by the PN window 108. As there is assumed to be no synchronization between the transmitter and the receiver, the receiver looks for a high signal, representative of a "1" bit during a time period represented by the peak detect windows 110, 112, 114, 116, 118. As illustrated, these peak detect windows 110, 112, 114, 116, 118 are time periods at the end of a PN window during which a bit is expected. Consequently, if the correlator indicates the presence of a high signal, as shown at 102, 104, and during the peak detect windows 110, 114, 116, 118, then a "1" is recognized by the receiver. Alternatively, if there is no high signal present, as illustrated in the peak detect window 112, then a "0" bit is presumed to have been sent.

Due to the fact that data is sent in bytes, in a so-called "trailer" 120, the present invention uses a particular data format in the preferred embodiment so that the receiver can both receive data of unspecified length, and remain synchronized with the transmitter, using only the correlator, and without actual synchronization. With continued reference to FIG. 3, the format of the trailer information is preferably in the form of 8-bit bytes which follow the "wake up" signal 100. The indication to the receiver that the "wake up" signal 100 has ended and that trailer data is about to be sent is the presence of a "0" bit ("start bit"), as illustrated at 112. Following the transmission of the start bit, ST, the transmitter will send data bits in 8-bit bytes. As the receiver has no way of knowing (in advance) how many data bytes will be sent, in the preferred embodiment of the invention, every eighth bit (i.e., bits $I_7, I_{15}, I_{23}, I_{31}, \ldots$) will be used as a "continuation bit", and it will be set to either a "1", to indicate that another data byte is to be sent, or to a "0", to indicate that the byte just sent was the last byte to be sent. Following the transmission of the last data byte, a parity bit and two stop bits are transmitted in the preferred embodiment of the invention, which happens to use odd parity.

A particular advantage of using a "1" as the continuation bit is that its presence may be used by the receiver to keep the receiver in synchronization with the transmitter by restarting the PN window, and thereby recentering the peak detect window around the expected time of receipt of the continuation bit, upon the receipt of each continuation bit.

While the foregoing explains the manner of performing both synchronization and data transmission during the start up handshake in accordance with the preferred embodiment of the invention, those skilled in the art will recognize that other techniques could be used.

In accordance with the invention, the handshake starts with a transmitter operating at the low predetermined baud rate which has previously been established. The low baud rate provides the maximum loop reach for the transmitter. The use of a common, low baud rate guarantees the compatibility with other RADSL products.

While other information can be negotiated, in accordance with the preferred embodiment of the invention, the first thing which two transceivers 12, 14 negotiate is the symbol rate which they will use. Since the constellation size (i.e., its bit/baud, or bit/symbol size) does not effect the frequency placement or the bandwidth the transmitter is using, the selection is preferably negotiated at the end of the startup using receive signal to noise ratio measurements.

Modems of the prior art, such as CCITT standard V.34 modems, initialized communications with one another by first listing which the baud rates they supported. Then they went into a test mode to determine which of the supported baud rates was the highest one which could be used for each new connection. They perform this testing anew each time a connection is made.

On the other hand, a transceiver 12 built in accordance with the present invention negotiates its symbol rate by first sending a list of the symbol rates which it can support. Then it sends a request to use a particular one of the supported baud rates, but no testing is performed. This can be accomplished by the modems 12, 14 of the present invention, as they are always being used to connect to each other over the same line 16. Due to the fixed line 16 between the modems 12, 14, once testing has been accomplished, and the test results have been stored, there is generally no need to retest on each new connection.

Another difference between the modems 12, 14 of the present invention, and those known in the prior art is that during the initial exchange of all available baud rates the modems 12, 14 each learn of the other's capabilities. Accordingly, in the event that it becomes necessary to change baud rates due to changes in the line condition, the other transceiver 14 will already know the baud rates which the transceiver 12 can support. Thus, if the modems 12, 14 recognize that they are experiencing a very low error rate over a suitable time period, they can agree to go to a higher baud rate, if they are already aware that a higher, commonly available baud rate is supported. Alternatively, they can go to a lower, commonly supported baud rate if line conditions indicate that too many errors have occurred during some period.

As training progresses, e.g., following the initial negotiation of baud rate, the number of bits/symbol (i.e., bits/baud), as well as other parameters, including Tomlinson precoder coefficients and forward error correction parameters, such as frame size and interleaving depth, which are used by Reed-Solomon ("RS") codes, are negotiated, as will be understood by those skilled in the art. Other data, such as the error count and the signal to noise ratio accumulated during the last startup period in which auto-baud testing (see below) was used, can also be transferred, and it is transferred in the preferred embodiment of the invention.

In accordance with the preferred embodiment of the invention, the transceivers 12, 14 can operate either in fixed mode, or in auto-baud mode. The use of auto-baud mode is determined by an initial request made by either modem 12, 14 when communications are established. The determination of which mode to select is included in the trailer data of the initial entry. As used herein, when a transceiver 12 operates in fixed mode the transceiver 12 requests a single baud rate to establish the connection, although, as always, all of the available baud rates are preferably listed. The lowest common symbol rate which exists between the transceivers 12, 14 will be used. In auto-baud mode, on the other hand, at the end of the startup handshake, the transceivers 12, 14 will go into a timed testing mode in which the signal quality and error rate are measured for all possible configurations. The results are then stored and used to request a fixed baud rate connection.

A feature of the present invention is that optimum constellation, RS frame size, and interleaving depth can be determined at the end of the receiver training period and before startup is completed.

Yet another feature, which is of commercial interest to the network owner is the ability to limit the maximum rate at which the transceiver 14 will operate based upon subscription options selected by particular customers. For example, if a customer's transceiver 12 is capable of receiving at 7 Mb/s, but the customer has selected only 1 Mb/s service, then the network owner can program its RADSL transceiver 14 to provide no more than 1 Mb/s service to the transceiver 12.

Figure 5:
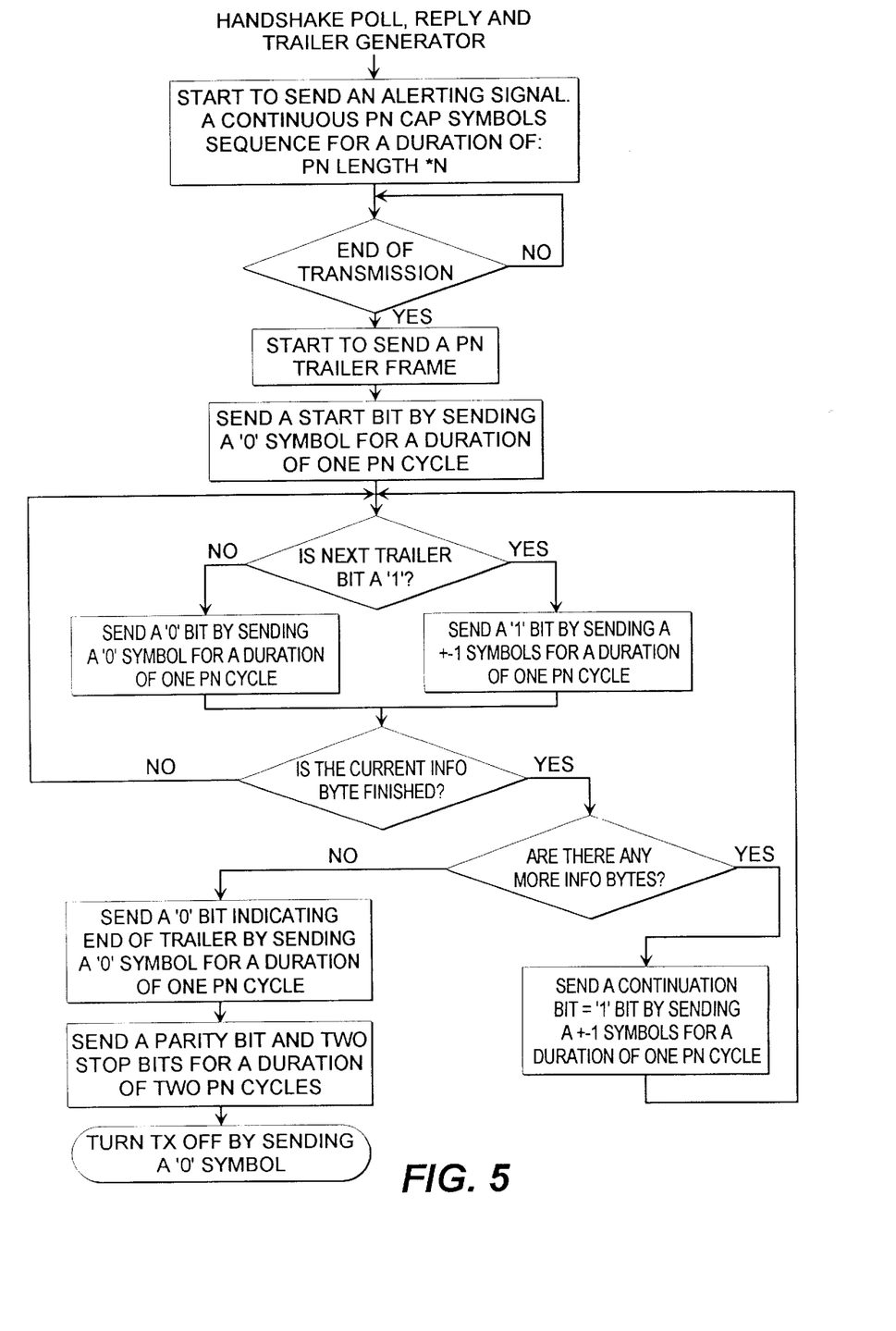
FIG. 5 is a flow chart illustrating the startup procedure used by the preferred embodiment of the transmitting transceiver of the present invention.
Figure 10:
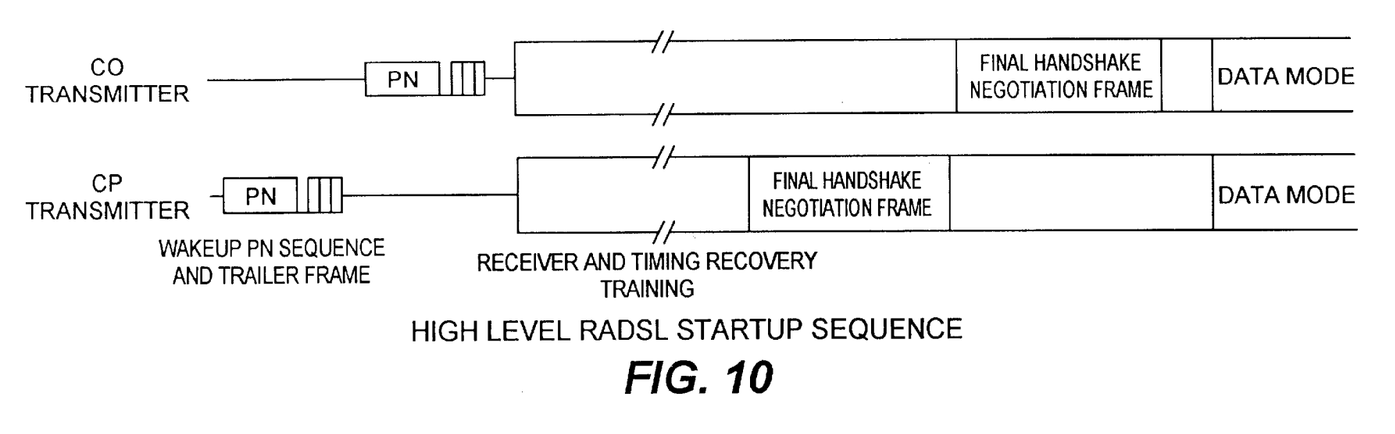
FIG. 10 is a high level depiction illustrating the startup signals on the subscriber line.

Referring now to FIGS. 4, 5, and 10, the handshake/data signal generator 22 of the present invention, and its operation, will be explained in greater detail. The handshake/data signal generator 22 accepts serial data into a scrambler 24 on a data line 26. The output of the scrambler 24, which is used to randomize the bit stream before the bits are mapped into symbols, goes through a bit to symbol mapping process 28. The specific bit to symbol mapping which is used is determined by the startup state machine 30 which also controls various other devices, such as the multiplexers 32, 34, and the symbol/baud and clock generator 36.

As explained above, during the initial handshake, a PN is used. The PN is generated by a PN symbol generator, which provides one of the possible inputs into a multiplexer 40. Also, as explained above, a zero symbol generator 42, represented by the "0" symbol provides the other possible input into the multiplexer 40. The input, whether a "1", i.e., the PN, or a "0", from the zero symbol generator 42, is at least 63 symbols long in the preferred embodiment of the invention. The data which is actually sent by the multiplexer 40 is determined by the initial handshake and rate negotiation which the RADSL transceiver performs. The output of the multiplexer 40 provides an input into the multiplexer 32, whose output, in turn, is an input into the multiplexer 34.

As shown, the output of multiplexer 34 goes through a filter 44 and a digital to analog ("D/A") converter 46, from which it exits as an analog transmit signal on line 48.

Figure 9:
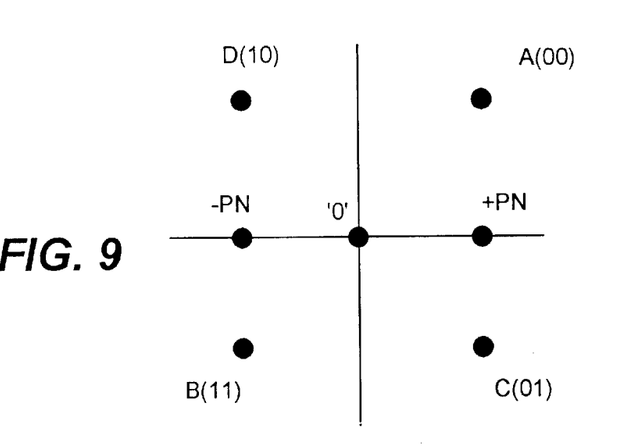
FIG. 9 illustrates the constellation used during the initial handshake.

The foregoing illustrated how the initial negotiation takes place. Once that has been accomplished, the final handshake negotiation exchange, in which Tomlinson precoder coefficients, forward error correction parameters (e.g., RS codes), final baud rate, and constellation settings are transmitted, are accomplished using the multiplexer 50, whose output also goes to multiplexer 32, and then ultimately out onto the line 48 as an analog signal. The inputs to multiplexer signal, shown as "A", "B", "C", and "D", are representative of the data which is sent during the final handshake. Note, that the initial handshake, for purposes of maintaining a robust system, uses the constellation illustrated in FIG. 9 for data exchange, as it is highly error resistant.

With reference to FIG. 5, a flowchart illustrating the initial handshake procedure is shown. In order to accomplish the robustness of the invention, a continuous PN CAP signal is sent. In accordance with the preferred embodiment of the invention, a 63 symbol PN is sent to represent a data bit of "1", while a 63 symbol "0" symbol is sent to represent a data bit of "0". Thus, information is transmitted for the initial handshake/rate negotiation by a relatively slow, but highly robust procedure. As used in the preferred embodiment of the present invention, and as illustrated in FIG. 5, data is transmitted using the coding scheme described to transmit bits which make up bytes. When long pieces of data (information bytes) must be transmitted, a scheme employing a continuation bit (a "1") is sent as a so-called "continuation" bit, whose presence indicates that additional trailer information is forthcoming. If it is not necessary to send trailer information, then, at the completion of sending the current byte, a "0" bit, followed by a parity bit and two stop bits are preferably sent (to indicate the end of the trailer information) in lieu of another continuation bit. Of course, the particular encoding scheme, while preferred, could be changed without departing from the overall scope of the invention.

Figure 6:
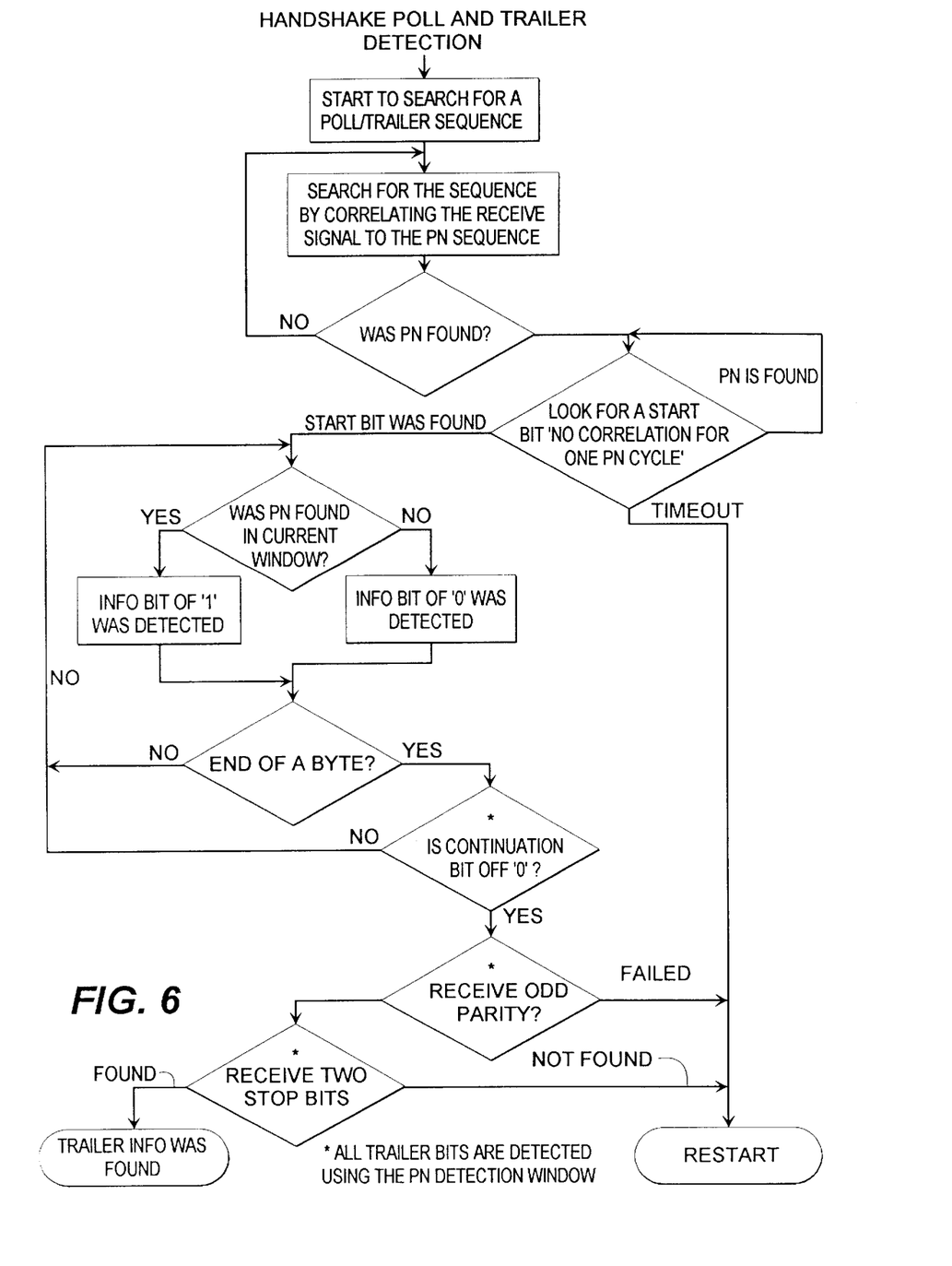
FIG. 6 is a flow chart illustrating the startup procedure used by the preferred embodiment of the receiving transceiver of the present invention.

With reference to FIG. 6, the operation of the receiving transceiver 14 is illustrated in a flow chart. As illustrated, the transceiver 14 continuously searches for a sequence corresponding to a PN. Upon detecting the wake up sequence using the PN correlator, the transceiver 14 looks for a start bit, and follows a procedure which is complementary to that set forth above, the details of which are set forth in the flow chart of FIG. 6.

Figure 7:
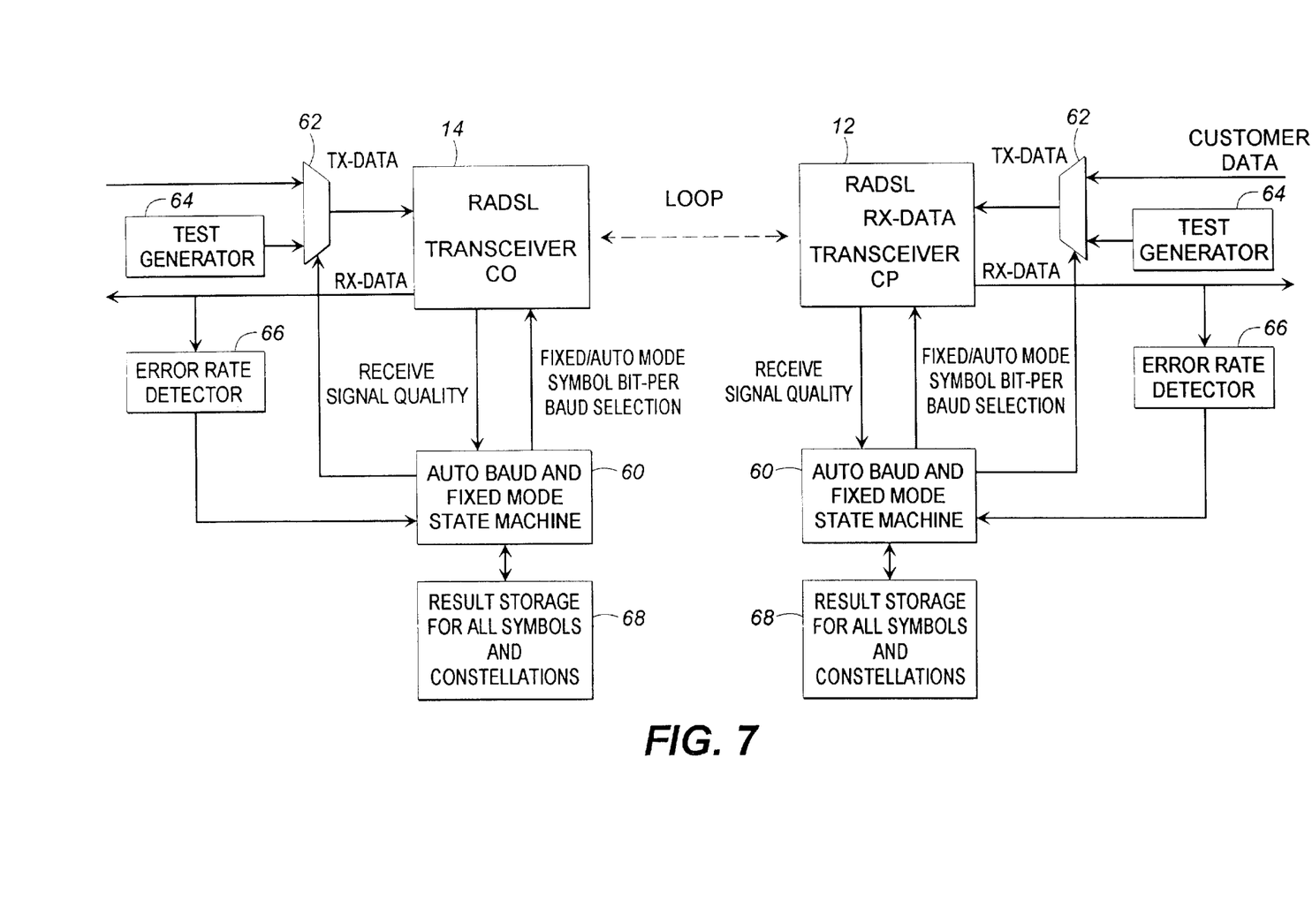
FIG. 7 is a block diagram of the auto-baud/fixed baud state diagram in accordance with the preferred embodiment of the present invention.
Figure 8:
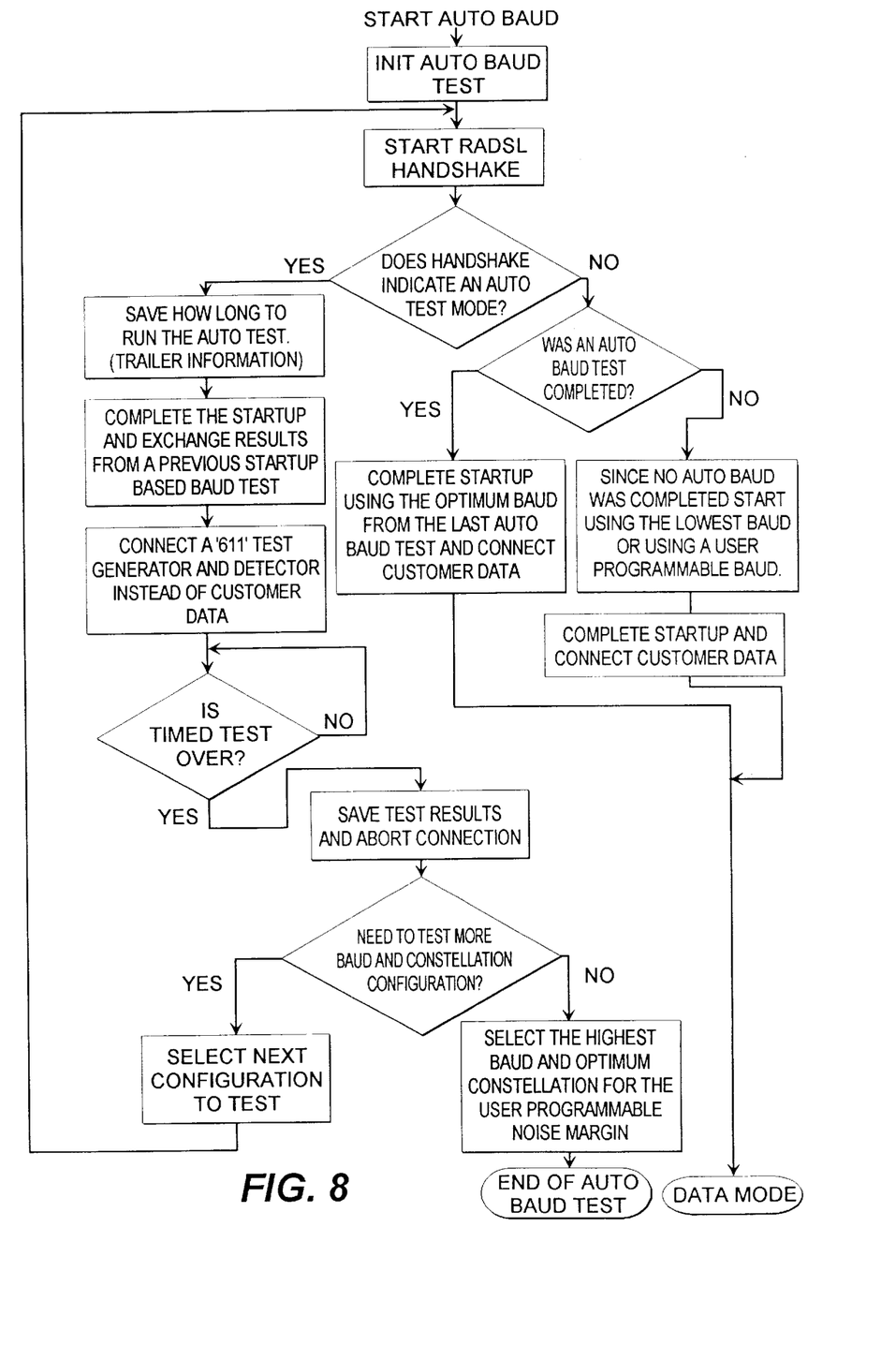
FIG. 8 is a flow chart illustrating the procedure used by the preferred embodiment of the invention for performing auto-baud.

Referring now to FIGS. 7 and 8, the auto-baud operation of a transceiver 12 (at the customer's location, CP) and a transceiver 14 (at the central office, CO) are shown. The transceivers 12, 14, are controlled by state machines 60 which control data transmission and reception through multiplexers 62. Test generators 64 which supply inputs to the multiplexers 62, are used, as will be explained with reference to the flow chart of FIG. 8, to generate data which is used by the other transceiver to detect errors using an error rate detector 66. The state machines 60 are able to collect data from the error rate detectors 66 and store that data in an appropriate memory storage means 68.

With reference to the flow chart of FIG. 8 the auto-baud test, in accordance with the preferred embodiment of the invention, is described. As illustrated in the flow chart, if an auto-baud test is requested, information about the length of the test will be transmitted. Assuming that the test is successfully completed, the highest allowed baud and optimum constellation for the user programmable noise margin will be selected. As illustrated in the flow chart, if no auto-baud test is selected, the results which were stored when the last, prior auto-baud test will be used. Alternatively, if no auto-baud test was ever completely performed, then the transceivers will start using the lowest baud, or, alternatively, by using a user programmed baud rate.

While the present invention has been described with reference to the use of a CAP system, those skilled in the art will recognize that a quadrature amplitude modulation ("QAM") system could also be used without departing from the spirit or scope of the invention. As explained, the PN is used in the present invention to actually send data, as well as for the initial synchronization. This encoding of actual data onto the PN, as explained, is relatively slow, as it takes 63 symbols (in the preferred embodiment) to send a single bit. However, this makes the current system extremely robust. To further enhance the operation of the present invention, during the initial negotiation, the transceivers exchange information about themselves, including both the desired symbol rates, and the list of available symbol rates. This negotiation, is based entirely upon the trailer, rather than on line testing.

Yet another feature of the present invention, not heretofore used, is that the transceivers use frequency division multiplexing, to separate the upstream and downstream data, together with symbol negotiation.

What is claimed is:

1. A method for establishing a symbol rate for a communication connection over a plain old telephone service ("POTS") between a central office transceiver and a remote transceiver comprising the steps of:

performing testing to evaluate connection parameters and storing those parameters in a parameter storage location, if it is a first connection between the central office transceiver and the remote transceiver;

retrieving stored connection parameters from the parameter storage location, if a first connection between the central office transceiver and the remote transceiver has been previously established; and negotiating a symbol rate by first sending from the remote transceiver to the central office transceiver, a list of supported symbol rates, then sending a request for a specific symbol rate.

2. The method as defined in claim 1, further including the step of negotiating other communication parameters.

3. The method as defined in claim 2, wherein the step of negotiating other communication parameters includes the negotiating at least one communication parameter from the group consisting of: Tomlinson precoder coefficients, frame size, interleaving depth, and Reed-Solomon codes.

4. A method for controlling a baud rate for a communication connection over a plain old telephone service ("POTS") between a central office transceiver and a remote transceiver comprising the steps of:

establishing an initial connection at a common, relatively low baud rate;

performing a startup sequence during which the central office transceiver and the remote transceiver exchange baud rate capabilities;

selecting an initial data communication baud rate;

communicating at the initial data communication baud rate; and adjusting the data communication baud rate in response to changing line conditions.

5. The method as defined in claim 4 further including the step of periodically testing a signal transmission quality to reflect a line condition on the connection between the central office transceiver and the remote transceiver.

6. The method as defined in claim 4 wherein the step of adjusting the data communication baud rate includes increasing the baud rate to a compatible higher baud rate, in response to improved line conditions.

7. The method as defined in claim 4 wherein the step of adjusting the data communication baud rate includes decreasing the baud rate to a compatible lower baud rate, in response to degraded line conditions.

8. A method for establishing a constellation size for a communication connection over a plain old telephone service ("POTS") between a central office transceiver and a remote transceiver comprising the steps of:

performing testing to evaluate connection parameters and storing those parameters in a parameter storage location, if it is a first connection between the central office transceiver and the remote transceiver;

retrieving stored connection parameters from the parameter storage location, if a first connection between the central office transceiver and the remote transceiver has been previously established; and negotiating a constellation size by first sending from the remote transceiver to the central office transceiver, a list of supported constellation sizes, then sending a request for a specific constellation size.

* * * * *